United States Patent [19]

Barrett et al.

[11] Patent Number: 5,047,451

[45] Date of Patent: Sep. 10, 1991

[54] WELDING CORROSION INHIBITING COATING

[75] Inventors: L. Donald Barrett, Cleveland Heights, Ohio; Dale R. Hahn, Union Lake, Mich.; Peter E. Pelloski, Ferndale, Mich.; Richard W. Ziegler, Troy, Mich.

[73] Assignee: Depor Industries, Inc., Birmingham, Mich.

[21] Appl. No.: 277,029

[22] Filed: Nov. 28, 1988

Related U.S. Application Data

[63] Continuation of Ser. No. 69,287, Jul. 1, 1987, abandoned.

[51] Int. Cl.$^5$ .......................... C08K 3/08; C09D 5/10; C09D 163/00
[52] U.S. Cl. ................................. 523/442; 523/458; 524/233; 524/306; 524/317; 524/361; 524/364; 524/365; 524/379; 524/391; 524/440; 524/441
[58] Field of Search ............... 523/458, 442; 524/440, 524/233, 306, 317, 361, 364, 365, 379, 391, 441

[56] References Cited

U.S. PATENT DOCUMENTS

| | | | |
|---|---|---|---|
| 3,471,310 | 10/1969 | Joseph et al. | 524/440 |
| 3,904,555 | 9/1975 | Matsuda et al. | 523/458 |
| 4,559,373 | 12/1985 | Guthrie et al. | 523/458 |
| 4,748,194 | 5/1988 | Geeck | 523/458 |

OTHER PUBLICATIONS

"The Merck Index", 11th edition, pp. 1572-1573.
"Hawley's Condensed Chemical Dictionary", 11th edition, N. Irving Sax et al., 1987, pp. 946, 1026.

*Primary Examiner*—John C. Bleutge
*Assistant Examiner*—David Buttner
*Attorney, Agent, or Firm*—Barnes, Kisselle, Raisch, Choate, Whittemore & Hulbert

[57] ABSTRACT

A corrosive resistant coating composition with improved weldability characteristics which is applied to a metal substrate as a wet film and then heated to dry and initiate curing to provide a protective coating tenaciously bonded to the substrate. The composition has corrosion inhibiting finely divided aluminum or stainless steel, a weldability agent of finely divided nickel, a primary bonding resin, and a vehicle of solvents. Preferably, the composition also has a secondary organic resin and thixotropic, metal suspension and hydroscopic agents.

14 Claims, No Drawings

WELDING CORROSION INHIBITING COATING

This is a continuation of co-pending application Ser. No. 07/069,287 filed on July 1, 1987, now abandoned.

FIELD OF THE INVENTION

This invention relates to a corrosion inhibiting organic coating for metal substrates and, more particularly, to a weldable corrosion inhibiting coating.

BACKGROUND OF THE INVENTION

Corrosion inhibiting organic coatings have been applied for many years to metal in coil form or sheet form prior to forming into articles. One of the problems encountered in using this pre-coated metal is that, if these articles are to be assembled, they must be joined mechanically since organic coatings are generally not weldable as a practical matter. In some applications, an organic coating with a powdered aluminum corrosion inhibitor has some slight degree of weldability which requires special techniques and equipment to be able to pass sufficient current to weld the substrate. Even with this coating, when welding can be achieved, the welded spot or area is not protected from corrosion by the coating.

The only organic coating known to be weldable without resorting to special techniques and equipment contains powdered zinc as a corrosion inhibitor. This type of coating provides cathodic protection against galvanic corrosion of the metal substrate. However, when the coating is in use on a metal substrate, it forms corrosion or oxidation by-products, such as zinc hydroxide, zinc chloride and zinc sulfide. These by-products make this coating unsuitable for certain applications, such as the interior surfaces of vessels for petrol chemicals such as brake fluid, alcohol, gasoline and diesel fuel. These by-products are precipitates which become suspended in the brake fluid, alcohol, gasoline or fuel oil and will contaminate and clog brake cylinders, carburetors and fuel injectors and produce deleterious effects in catalytic converters for controlling the emissions of automotive and truck engines.

U S. Pat. No. 4,391,855 discloses for a metal substrate an effective corrosion inhibiting and weldable organic coating containing a phenoxy resin and powdered zinc. This patent also discloses an organic coating having a phenoxy resin and powdered aluminum, cadmium and/or stainless steel, which in most applications cannot be welded, and in others can only be welded by special techniques and equipment.

SUMMARY OF THE INVENTION

In accordance with this invention, a welding agent, powdered nickel, and a non-weldable corrosion inhibitor of a finely divided metal, such as aluminum or stainless steel, are dispersed in a primary bonding resin and a blend of solvents. Preferably, the coating is initially adhered to the metal substrate by a secondary resin until the primary resin is fully cured to bond and tenaciously adhere a dry film of the coating to the substrate. When a high degree of chemical resistance is desired, it can be achieved by utilizing primary and secondary resins which cross link when cured while still maintaining a degree of flexibility. Preferably, a thin and uniform dry film is produced on the substrate by including a thixotropic agent, premature curing of the primary bonding material is prevented by a hydroscopic agent, and the finely divided metal is prevented from settling out by a suspension agent.

Objects, features and advantages of this invention are to provide for a metal substrate, a corrosion inhibiting organic coating which will not have a deleterious effect on liquid petrol chemicals in contact therewith, is readily weldable without utilizing any special techniques or equipment, has improved corrosion resistance, abrasion resistance and excellent adhesion qualities, improves the torque-tension relationship of threaded fasteners to which it is applied, enhances the formability of the substrate, upon welding of the substrate flows back to the edge of the welded area and thereby improves corrosion resistance, may include a coloring pigment, can be readily, easily and economically applied in one coat and cured at a relatively low elevated temperature in a relatively short period of time, has a low coefficient of friction, and is stable, rugged, durable and economical.

These and other objects, features and advantages of this invention will be apparent from the following detailed description and appended claims.

DETAILED DESCRIPTION OF THE INVENTION

In this invention, a thin layer of a corrosion resistant coating in a liquid form is applied to a metal substrate such as by dipping, rolling, spraying or the like. The liquid layer is converted to a solid dry film and is bonded, tenaciously to the metal substrate by heating at an elevated temperature for a relatively short time. The heating evaporates the solvents in the liquid layer and initiates curing of a primary bonding resin to provide a dry, thin, uniform, drawable, and weldable protective film permanently adhered to the substrate.

CORROSION INHIBITING METAL

In the composition of the coating, the primary corrosion inhibitor is believed to be a finely divided metal. For a substrate of iron or steel suitable metals are aluminum, stainless steel, alloy and blends thereof and the like. For most applications, finely divided aluminum is preferred because it produces a coating with an extremely low coefficient of friction, an improved and consistent torque-tension relationship on threaded fasteners, and no deleterious effect on and a specific chemical resistance to such petrol chemicals as alcohol, brake fluid, gasoline, and diesel fuel.

Preferably, the finely divided metal is a powdered metal having an average particle size of less than 60 microns, desirably less than 40 microns, and preferably less than 20 microns and a maximum individual particle size desirably not more than 100 microns. Preferably, the powdered metal has an average particle size in the range of about 2 to 15 microns with a maximum individual particle size of about 30 to 60 microns.

Suitable powdered metals are commercially available from various sources. Powdered aluminum can be purchased from the Reynolds Metals Company of Louisville, Ky. under the trade designation 8-232. Although non-leafing grades of aluminum are preferred for most applications, leafing grades may also be used. Powdered stainless steel can be purchased from U.S. Bronze Powders, Inc., of Flemington, N.J.

WELDABILITY AGENT

Powdered nickel provides weldability for organic coatings normally considered not weldable because they contain corrosion inhibiting metals such as aluminum and stainless steel. Powdered nickel does not impair the adhesion, drawability and corrosion inhibiting properties of the coating.

The powdered nickel has a particle size of about 1 to 100 microns, desirable 1 to 40 microns, and preferably 1 to 10 microns. Nickel particles with a rough mace-like, spiked or granular configuration are far superior to particles having a flat leaf. The coating composition contains a quantity of nickel by weight of the total solids in the dry film equal to about 15% to 65%, desirably 20% to 55% and preferably 20% to 40%. Suitable powdered nickel can be obtained from Novamet, Division of Inco, of Wychoff, N.J.

PRIMARY BONDING RESIN

In the coating composition a variety of primary bonding resin systems can be used to achieve suitable weldability characteristics while maintaining excellent corrosion protection. Suitable primary bonding resins are epoxy, phenoxy, alkyd, Saran (polyvinylidene chloride, vinyl toluated alkyd, polyester, isocyanate and acrylic.

The preferred primary bonding resin is a thermoplastic linear epoxy or phenoxy resin having a molecular weight in the range of about 3,000 to 70,000 and preferably an average molecular weight of 40,000 to 60,000 before curing. The molecular number (Mn) of this phenoxy resin is approximately 2,000-5,000 and it has a polydispersivity of 5 to 12. This phenoxy resin is produced by an epichlorohydrin bisphenol-A reaction. This phenoxy resin has a high molecular weight with many hydroxyl groups and essentially no terminal epoxy groups which are highly reactive. Suitable phenoxy resins are commercially available from Reichhold Chemicals of New York City, N.Y., as Rekloid 38525, Ciba-Geigy of Ardsley, N.Y., as GZ9713, and Union Carbide of New York City, N.Y., as PKHH. Ciba-Geigy phenoxy resins are preferred because they are believed to produce coatings having the best adhesion characteristics.

A suitable epoxy resin is commercially available from Ciba-Geigy of Ardsley, N.Y., as 497-C55. An alkyd resin is commercially available from Spencer-Kellogg of Buffalo, N.Y., as Aroploz 6230A1-90. Saran polyvinylidene chloride is commercially available from Dow Chemical Co. of Midland, Mich. as Suran F310. Vinyl toluated alkyd resin is commercially available from Spencer-Kellogg of Buffalo, N.Y., as Kelysol 719-60E. An isocyanate resin is commercially available from Mobay Chemical of Pittsburg, Pa. as Isocyanate ST. Acrylic resin is commercially available from Rohm & Haas of Philadelphia, Pa., as Acryloid B-72 and Acryloid B-66X.

SECONDARY RESIN

The corrosion inhibiting properties of the coating composition, particularly its resistance to salt spray, are improved by the addition of secondary corrosion inhibiting resins. These secondary resins also increase the resistance of the coating to certain solvents such as brake fluid and gasoline. Suitable secondary resins are phenolic, resole, triazine, melmamine-formaldehyde, ketimimes, ureaformaldehyde, amino, titanates and hexo-methoxymethyl-melamine resins. Suitable secondary resins available from Reichhold Chemical Company of Detroit, Mich., are melamine-formaldehyde (MM-55 RCI, MM-83-RCI, MM-46-RCI, MM-47-RCI), urea-formaldehyde (F-200-E RCI, F-222-E RCI, F-240-E RCI), triazine (MX-61 RCI), and phenolic (Varcum 2381-B). A suitable hexo-methoxymethylmelamine resin is available from American Cyanamid Co., Industrial Chemical Div. of Wayne, N.J. (Cymel 300, Cymel 302). Suitable phenolic and resole resins are available from Union Carbide Corp. of Danbury, Conn. (BKR-2620), Ciba-Geigy Corporation (HZ-949-U), and General Electric Company of One Plastics Avenue, Pittsfield, Mass. (Methylon 75108, Methylon 75202).

In the coating composition, these secondary resins may comprise about 1% to 50% by weight of the primary bonding resin and desirably, about 5% to 30% and, preferably 10% to 15% by weight of the primary bonding resin. The adhesion characteristics of the coating tend to be degraded if significantly more than about 50% by weight of these secondary resins are used.

The total amount of resin (primary bonding resin plus any secondary corrosion inhibiting resins), of the composition may be in the range of about 10% to 525% by weight of the metal powders, more desirably, in the range of about 12% to 100% by weight, and preferably, in the range of about 14% to 50% by weight of the metal powders.

DRAWING AGENT

Polytetrafluorethylene (PTFE) is believed to be the only drawing agent which will maintain the corrosion resistance of the coating and allow coated metals to be cold drawn into shapes and be severely deformed with little and in most instances no die drawing compound being used, while also preventing destruction of the coating film during the drawing process.

Desirably, the PTFE has particles of a size equal to about 1 to 100 microns, desirably 1 to 60 microns and preferably 1 to 20 microns. The coating composition may contain a quantity of PTFE drawing agent equal to about 1% to 25% by weight of the total solids, desirably 1% to 10%, and preferably 2% to 4%. Suitable PTFE is available from Micro Powder of 1075 Central Park Avenue, Scarsdale, N.Y. as 10583.

THIXOTROPIC AGENT

Preferably, to insure that the coating does not gel prior to application to a substrate and that it has suitable flow and wetting characteristics around edges of the substrate, the coating contains a thixotropic agent. A suitable thixotropic agent is silane treated silica dioxide. An appropriate amount of this thixotropic agent is believed to also modestly improve the salt spray corrosion resistance of the coating but an excess amount is believed to produce a porous thin coating having a deleterious effect on corrosion resistance. The amount of this thixotropic agent in the coating may be about 0.4% to 12% by weight of the powdered metal and preferably about 1% to 6% by weight of the powdered metal. Silane treated silica dioxide thixotropic agents are commercially available from Tulco Corporation of Faulkness Street, North Billerica, Mass. as Tullanox 292 and 500; Cabot, Inc. of Detroit, Mich. as Cabosil M-5; DeGussa Corporation of P.O. Box 2005, Tetesboro, N.J. as R-972; and Pittsburgh Paint and Chemical Co. of One Gateway Center, Pittsburgh, Pa. as Hi-Sil 600.

SUSPENSION AGENT

Preferably, a suspension agent is used to ensure that the powdered metal does not settle out of the coating composition and form a hard cake. A suitable suspension agent is polyethylene which can be purchased as Suspensol 220 from Poly-Resyn, Inc. of West Dundee, Ill., and as MRT-1 from Matteson-Ridolfi, Inc. of Detroit, Mich. Suspensol 220 is essentially one part polymer in three parts xylene by weight. MRT-1 is also believed to be essentially one part polyethylene in three parts xylene by weight. The amount of polyethylene used as a suspension agent may be about 0.2% to 5% by weight of the metal powder and preferably about 0.4% to 2.6% by weight of the metal powder. This is equivalent to about 0.8% to 20% and 1.6% to 10.4% by weight, respectively, of the Suspensol 220.

HYGROSCOPIC AGENT

Preferably, the coating contains a water scavenger or hygroscopic agent. Suitable hygroscopic agents are calcium oxide, silica dioxide, barium oxide, and potassium chloride. A suitable silica dioxide is commercially available from Davidson Chemical Co. of Baltimore, Md. as Syloid AL-1 and Syloid ZN-1. The amount of hygroscopic agent in the coating composition may be 0.2% to 12% by weight of the powdered metal and preferably, about 0.4% to 6% by weight of the powdered metal. An excess amount of hygroscopic agent is believed to decrease the corrosion resistance of the coating.

VEHICLE

The vehicle or carrier of the coating composition preferably contains both active and inactive solvents that are compatible with the resins. Active solvents are those that actually dissolve the resin and inactive solvents are those used to thin the composition.

Suitable active solvents for epoxy and phenoxy resins are cellosolve acetate, dibasic ester, methyl ethyl ketone, methyl isobutyl ketone, dimethylformamide and acetone. A suitable active solvent for alkyd resins is xylene. A suitable active solvent for saran resins is methyl ethyl ketone. Suitable active solvents for vinyl alkyd are xylol, xylene and toluene. A suitable active solvent for polyester resins is naphtha. A suitable active solvent for isocyanate resins is propylene glycol. Suitable active solvents for acrylic resins are xylol, xylene and toluene.

Suitable inactive solvents for epoxy, phenoxy, polyester and isocyanate resins are aromatic hydrocarbons such as xylol, xylene and toluene. Suitable inactive solvents for vinyl alkyd, saran and acrylic resins are acetates.

Suitable aromatic hydrocarbon solvents are commercially available from Chem-Central of 13395 Huron River Drive, Detroit, Mich., as SC 100 and SC 150; and Neville Chemicals Co. of Neville Island, Pittsburgh, Pa. as Nebony L-55 and Nebony L-100. The SC 100 solvent has a boiling range of 311° F. to 344° F. and a flash point of 107° F. The SC 150 solvent has a boiling range of 370° F. to 410° F. and a flash point of 151° F. The Nebony solvents have a flash point of 230° F., a molecular weight of about 300 to 475, and are believed to have excellent resistance to alkaloids, dilute acids and moisture.

The vehicle solvent system may consist of about 10% to 40%, desirably 15% and 35%, and preferably 25% to 30% by weight of inactive solvents and the balance preferably of active solvents.

The coating composition contains sufficient vehicle solvents to produce the viscosity desired for the particular method of applying the liquid coating to a substrate. The viscosity of the composition in a No. 4 Ford cup is usually in the range of 20–280 seconds, desirably 30–180 seconds and preferably 60–120 seconds. A coating composition viscosity in this range can usually be obtained when the vehicle solvents by weight are about 1/5 to 3 times the weight of all the resins in the composition.

MAKING THE COMPOSITION

Preferably, the constituents of the composition are milled with a fraction of the total solvents in a sand mill adjusted and operated to produce a homogeneous mixture with a particle size having a Hegman grind rating of 4.5 H to 7.5 H. Typically, the appropriate initial amount by weight of the solvent system is usually one to two times the weight of the total resins.

Preferably, all the ingredients (including the nickel) other than the corrosion inhibiting metal, are added and milled together to achieve a Hegman grind rating of 4.5 H to 7.5 H while maintaining a temperature in the range of 110° F. to 180° F. and preferably 110° to 125° F. Thereafter, the principal corrosion inhibiting metal is added and the mixture is again milled to again achieve a Hegman grind rating of 4.54 to 7.5 H. This second milling should be done for at least 15 minutes at preferably 110° F. to 125° F. This milled composition is then blended at a temperature in the range of about 110° F. to 180° F. with a solvent system compatible with the resin system to produce the desired viscosity.

USING THE COMPOSITION

In use, a thin wet film of the coating composition is applied to a metal substrate, typically low carbon steel, terne plate or galvanized steel, and then cured to provide a dry corrosion resistant protective coating. If needed to facilitate the particular method of application, the viscosity of the coating composition can be further reduced by adding a relatively small amount of compatible solvents which preferably are a mixture of the active and inactive solvents of the vehicle of the coating composition.

After a thin wet film of composition with a wet thickness of about 1 to 4.5 mils is applied to the substrate, the wet film is heated to a relatively low elevated temperature for a sufficient period of time to evaporate the vehicle, thereby drying the film and initiating a reaction bonding the coating to the substrate. The thickness of the dried and cured coating is not more than about 1.5 mils and usually in the range of about 0.3 to 0.8 of a mil. The wet film can be dried by heating it to an elevated temperature for a period of time of about 15 seconds to 90 minutes, desirably about 30 seconds to 50 minutes and preferably 30 seconds to 15 minutes so that the maximum temperature of the substrate is in the range of 200° F. to 500° F., desirably 250° F. to 450° F., and preferably about 350° F. to 450° F. The maximum temperature is 500° F. for coating terne plate and 425° F. for electrogalvanized steel.

In practice, the dried and cured coating tenaciously adheres to the metal substrate, provides excellent weldability and prevents corrosion without contamination of liquid petrochemicals in contact with the coating.

EXAMPLES

The following examples of the effect of these compositions on the weldability of metal substrates are illustrative of this invention and are not intended to limit the scope of the invention as defined by the appended claims.

The following coating composition was used in the subsequent examples except where constituents were substituted as indicated in such examples. Where the primary bonding resin is substituted in an example, a compatible solvent system is also substituted. The coating composition was applied and cured at an elevated temperature to adhere it to terne plate blanks 0.030 of an inch in thickness unless otherwise indicated.

The preferred coating composition of this invention is essentially:

|  |  | Weight in Pounds | % Solids |
|---|---|---|---|
| Phenoxy Resin | (Ciba-Geigy GZ9713) | 247.0 | 43.32 |
| Calcium Oxide | Baker Products | 2.4 | 1.31 |
| Hygroscopic Agent | (Al-1, Davidson Chem) | 2.4 | 1.31 |
| Suspension Agent | (Suspensol 220, Poly Resyn) | 13.2 | 1.74 |
| Phenolic Resin | (HZ949U, Ciba-Geigy) | 8.9 | 2.44 |
| Curing Agent | (MX-61, Reichhold Chem) | 12.5 | 4.52 |
| Aluminum Powder | (5250, Alcoa) | 30.0 | 16.27 |
| PTFE | (HT-1, Micro Powders) | 3.1 | 1.70 |
| Nickel Powder | (525, Inco) | 50.0 | 27.39 |
| Solvent | (PMA, Arco) | 134.0 | — |

EXAMPLE I

Effect of Resin Variable

The improvement in weldability achieved with a powdered nickel coating composition is independent of the resin used. A welding test covering both spot and seam welding was developed to demonstrate weldability. It is generally accepted that properly formulated powdered zinc coatings are readily weldable under conventional conditions and that powdered aluminum coatings are either not weldable or weldable with difficulty and only by using special techniques and equipment. A Taylor Winfield welder No. EBBL-3-8 was used for the spot welding tests wherein the electrode force, heat percent, and cycles were set as indicated in each test. The coatings to be evaluated were compared to a powdered zinc (82% by dry weight) and resin coating applied to terne plate. The welding conditions of electrode force, percent heat, and cycles were varied to make the welding progressively more difficult until a point was reached where the powdered zinc coating would just barely make a weld. These welding conditions were then used for the other coatings. Flat ¼" electrodes were used in all spot weld tests.

The preferred coating composition disclosed above was utilized in the following test as a control. For the resins Epoxy I and Epoxy II, the primary bonding resin of the preferred coating composition above, was replaced with Ciba-597KT55 and Carbide PKHH respectively. In separate tests, each of the respective coatings were individually applied to one side of two terne plate substrates, dried at an elevated temperature, and then the plates were welded together with the coated sides face to face.

| Resin | Facing Surfaces | Electrode Force Lbs. | Heat % | Amps Produced | Cycles | Button Dia. |
|---|---|---|---|---|---|---|
| Epoxy I | Al/Al | 400 | 84 | 9.10 | 10 | .28 |
| Epoxy II | Al/Al | 400 | 84 | 9.45 8.90 | 10 | .23 .18 |
| Control | Al/Al | 400 | 84 | 7.21 8.20 | 10 | .26 .24 |

From this test, it can be seen that the improvement in weldability is independent of the resin used.

EXAMPLE II

Effect of Welding Additive

In the following example, the preferred coating described above was varied such that in one case the aluminum content was increased and no weldable additive was used, for the purposes of a control. In other applications, the type of welding additive was varied to examine the suitability of these materials as welding improvers. The substrate in these tests was terne metal.

| Al Wt. (lbs) | Welding Additive Type | Welding Additive Wt.(lbs) | Facing Surfaces | Electrode Force (lbs) | Heat % | Produced Amps | Cycles | Button Dia. |
|---|---|---|---|---|---|---|---|---|
| 74 | 0 | 0 | Al/Al | 400 | 84 | 0 | 0 | 0 |
| 30 | Ni 525 | 50 | " | " | " | 10.1 | 8 | .23 |
| 30 | Stainless | 43 | " | " | " | 0 | 0 | 0 |
| 30 | NI 123 | 50 | " | " | " | 10.1 | 8 | .20 |
| 30 | Al 201 | 15.2 | " | " | " | 0 | 0 | 0 |
| 30 | Ni HNP | 50 | " | " | " | 10.0 | 8 | .20 |
| 30 | Al 5413 | 15.2 | " | " | " | 10 & 0.0 | 8 | .19 & 0.0 |

From the foregoing tests it can be seen that not all metal powders are sufficiently conductive to provide welds equivalent to a zinc coating, however, nickel pigments are suitable welding additives for compositions containing aluminum as a corrosion inhibitor.

Additionally, a test comparing a rough granule type nickel to nickel flake (50 lbs. of nickel in each coating) ran as follows:

|  | Electrode Force (Lbs.) | Heat % | Cycle | Result |
|---|---|---|---|---|
| Ni 525 Granule | 400 | 78 | 10 | Good Weld |
| Ni HC-1 Flake | 400 | 78 | 10 | No Weld |

From the foregoing comparison it can be seen that not all nickel pigments have the same weldability, and granule nickel pigments are far superior to flake nickel pigments.

EXAMPLE III

Seam welding tests essentially duplicate the spot weld tests although seam welding is more forgiving and some borderline spot weld formulas may pass seam welding tests. In the following example, the preferred composition as described above was utilized except the nickel powder was substituted for by the pigment as indicated. The method of seam welding was conventional, wherein two pieces of metal were coated with a composition as indicated, dried, and placed in an overlapping position. Two opposed current conducting wheels sandwiched the two pieces of metal together and thus produced the seam weld. A good weld is defined as one in which the two pieces of metal are firmly secured together about a substantial area. A fair weld is defined as a weld in which the two pieces of metal are barely held together and the area of weld is relatively small. Start delay is defined as a condition wherein the opposed current carrying wheels move a distance along the overlapping pieces of metal before a weld begins to form. Start delay is believed to be caused by excessive coating resistance.

| | Seam Weld Test | | |
|---|---|---|---|
| Welding Agent Added to Aluminum Base Coating | Amps | Electrode Force (Lbs.) | Results |
| Aluminum Base No Agent | 4200 | 400 | No Weld |
| Ni Granule | 4200 | 400 | Good Weld |
| Ni Flake | 4200 | 400 | Fair Weld |
| Ni Granule 525 | 5200 | 280 | Good Weld |
| Ni Granule 123 | 5200 | 280 | Good Weld |
| Ni Granule 225 | 5200 | 280 | Good Weld |
| Ni Granule HDNP | 5200 | 280 | Good Weld |
| Al 5413 | 5200 | 280 | Start Delay (poor weld) |
| Al 201 | 5200 | 280 | No Weld |
| Stainless | 5200 | 280 | Start Delay (poor weld) |

EXAMPLE IV

Effect of Welding Additive Concentration

The concentration of nickel granules in a formula that is required to provide good welding will be dependent upon many factors such as the corrosion inhibiting metal, resin type, metal-resin ratio, type of substrate, etc. Since one of the concerns is to improve the weldability of aluminum pigmented coatings on terne metal, a concentration curve was developed. In the following example, the preferred composition as described above was utilized wherein the concentration by weight was varied with respect to the nickel and aluminum additives. The welding ratings are defined as previously described. Panels were welded with aluminum coated surfaces facing each other.

| | | Spot Weld Test | | | |
|---|---|---|---|---|---|
| Ni Concen. (Lbs.) | Al Concen. (Lbs.) | Electrode Force (Lbs.) | Amps | Cycles | Results |
| 67 | 15 | 500 | 8.4 | 10 | Good Weld |
| 50 | 15 | 500 | 8.3 | 10 | Good Weld |
| 45 | 15 | 500 | 8.1 | 10 | Fair Weld |
| 33 | 15 | 500 | 0 | 0 | No Weld |
| 25 | 15 | 500 | 0 | 0 | No Weld |
| 0 | 66 | 500 | 0 | 0 | No Weld |

Seam welding tests gave similar results. The 67 to 50 pound concentration of nickel started welding immediately, and produced a good weld. The 45 pound concentration of nickel started welding immediately, however, it produced a fair weld having a narrower width than that of the seam welding wheel. The 33 pound concentration of nickel had a short delay before starting to weld, and the 25 pound concentration had a much longer delay. In practice, the minimum concentration of nickel is believed to be about 15% and desirably 20% by weight of the total solids in the coating composition.

EXAMPLE V

Effect of Aluminum Concentration

The effect of aluminum concentration was explored by choosing an acceptable concentration of nickel as a standard and then varying the aluminum content. The spot weld conditions chosen were purposefully borderline so differences, if any, would appear. The substrate is terne metal.

The preferred composition was utilized except that the concentration of aluminum was varied. Spot welding was attempted on the substrates using the Taylor Winfield Welder set at 78% heat. Fifty percent good welds is defined as a condition wherein approximately one-half of all welds attempted produce a button having a diameter in the range of 0.20 to 0.25.

| Ni Concen. (Lbs.) | Al Concen. (Lbs.) | Electrode Force (Lbs.) | Amps | Cycles | Results |
|---|---|---|---|---|---|
| 50 | 30 | 440 | 8.7 | 10 | 50% Good Welds |
| 50 | 45 | 440 | 8.2 | 10 | 50% Good Welds |
| 50 | 60 | 440 | 8.8 | 10 | 50% Good Welds |

There appeared to be no affect on welding of aluminum concentration.

EXAMPLE VI

Effect of Substrate

The preferred composition as described above was utilized wherein the concentration of nickel and aluminum was varied as indicated and was applied over electrogalvanized steel (E.G.), cold rolled steel (C.R.S.), phosphate coated cold rolled steel (Phos. CRS), terne plate (terne) and chrome-coated electrogalvanized steel (EG Chrome). Spot welding was attempted on the substrates using the Taylor Winfield Welder set at 78% heat.

| Ni Concen. (Lbs.) | Al Concen. (Lbs.) | Substrate | Electrode Force (Lbs.) | Amps | Cycles | Results |
|---|---|---|---|---|---|---|
| 0 | 66 | E.G. | 1000 | 0 | 14 | No Weld |
| 50 | 30 | E.G. | 1000 | 8.7-10 | 14 | .25 Button |
| 0 | 66 | C.R.S. | 750 | 0 | 14 | No Weld |
| 50 | 30 | C.R.S. | 750 | 7.7-8.8 | 14 | .21 Button |
| 0 | 66 | Phos. CRS | 750 | 0 | 0 | No Weld |
| 50 | 30 | Phos. CRS | 750 | 0 | 0 | No Weld |
| 0 | 66 | Terne | 400 | 0 | 0 | No Weld |
| 50 | 30 | Terne | 400 | 8.8 | 8 | .25 Button |
| 5 | 30 | EG Chrome | 1000 | 11.3 | 14 | .25 Button |

These tests show that the coating composition applied directly over all metal substrates can be welded but that different substrate metals require somewhat different welding current, cycle and electrode force conditions. The tests also shows that a light chromate coating on electrogalvanized metal is not detrimental. They also show that the conventional nonwelding character of phosphate coated steel could not be overcome at these borderline conditions and this concentration of welding additive in the coating composition.

EXAMPLE VII

Adhesion and Corrosion Testing

The preferred composition described above was utilized wherein the aluminum concentration and nickel concentration was varied as indicated below. Adhesion and corrosion tests were performed on blanks of terne plate, 30/1000 inches in thickness with these coatings thereon. The blanks were uniformly coated across their width and length on one side only, with the coatings having the various compositions to a dry thickness of 10.25 microns to 20.0 microns. The coated blanks were subjected to an Olsen Cup test in which a metal ball, 22 mm in diameter, was forced into the blank until a dome of 7.62 mm in depth was formed with the coating on the tension side.

For the adhesion test, within twenty minutes after forming the dome, 3-M Tape Number 710, 19 mm wide and 77 mm long was applied over the dome area and smoothed firmly and uniformly with a finger or thumb pressure. The tape was then removed by a firm rapid upward pull (perpendicular to the panel) and placed on a white paper for better visibility. The tape was compared to the Olsen Cup photographic standards as described in General Motors Engineering Standard GM-6190-M, which ranks the quality of the coating appearing on the tape on a scale of 1-10, wherein 10 represents no coating on the tape and hence very high adhesion to the metal blank, and 1 represents full coating on the tape and hence no adhesion to the metal blank.

For the corrosion test, the drawn dome of the blank was exposed to a 5% natural salt spray at room temperature with its pH adjusted to 6.5 to 7.2, for a period as indicated below and per General Motors Engineering Standard GM-4298-P. Corrosion resistance was rated by comparing the exposed domes of the blank to the Olsen Cup photographic standards of GM-6190-M. Corrosion resistance was rated on a scale of 1-10, wherein 10 represents no coating loss on the domed portion on the blank and hence high corrosion resistance, and 1 represents complete coating loss on the domed portion of the blank and hence no corrosion resistance.

Similar corrosion and adhesion tests were performed on a flat substrate or field.

| Ni Concen. (Lbs.) | Al Concen. (Lbs.) | 216 Hr. Salt Spray Field | 216 Hr. Salt Spray Dome | Dome Adhesion |
|---|---|---|---|---|
| 50 | 15 | 10 | 10 | 9+ |
| 50 | 30 | 10 | 10 | 9+ |
| 50 | 45 | 10 | 10 | 9+ |
| 50 | 60 | 10 | 10 | 9+ |
| 0 | 66 | 10 | 10 | 9+ |

These results show that corrosion resistance and adhesion are unaffected by various levels of aluminum.

The same tests on formulas with varying levels of nickel additive gave the following results:

| Ni Concen. (Lbs.) | Al Concen. (Lbs.) | 340 Hr. Salt Spray Field | 340 Hr. Salt Spray Dome | Dome Adhesion |
|---|---|---|---|---|
| 67 | 15 | 8 | 7 | 9+ |
| 50 | 15 | 8 | 7 | 9+ |
| 45 | 15 | 9 | 7 | 9+ |
| 33 | 15 | 9 | 6 | 9+ |
| 25 | 15 | 9 | 6 | 9+ |
| 0 | 67 | 9 | 7 | 9+ |

Again, in the extended salt spray test, the concentration of nickel additive had no effect on the results.

The preferred formula described above was utilized in the following test wherein the nickel weld additive was varied as indicated. The substrate was galvanized steel and in some tests was pre-treated with a chromate metal to improve the corrosion protection. Where indicated, a corrosion and blister additive was also included such as (1) four grams of zinc chromate; or (2) four grams of moly white. The coated panels were tested for rust and blister, in accordance with ASTM Standards and adhesion in accordance with GM-6190-M. Rust was rated on the scale of 1-10, wherein 10 represents no rust over the exposed area, and 1 represents rust covering the entire exposed area. Blistering (bubbling of the coating) was rated by size and density per area according to ASTM D174. The size was rated on a scale of 1-10, where 10 is no blisters of any appreciable size, and 1 is large blisters. Density was rated as F for few and D for dense.

| Pretreat | Nickel Weld Additive (Lbs.) | Corrosion Additive | Salt Spray Rust | Salt Spray Blister | Adhesion |
|---|---|---|---|---|---|
| No | None | None | | | 9+ |
| Yes | 50 | None | 10 | 4-6 F | 9+ |
| No | 50 | None | 10 | 4 D | 9+ |
| Yes | 50 | Yes (1) | 10 | 10 | 9+ |
| Yes | 50 | Yes (2) | 10 | 10 | 9+ |
| Yes | None | Yes (1) | 10 | 10 | 9+ |

These tests again show no effect of the nickel weld additive on corrosion protection when applied over electrogalvanized metal.

I claim:

1. A corrosion resistant liquid coating composition for application to and curing on a steel substrate to a dry film and being electric resistance weldable after curing, comprising: a finely divided metal selected from the group consisting of aluminum, stainless steel and alloys and blends thereof, and having an average particle size not greater than about 60 microns and a maximum individual particle size not greater than about 100 microns; a resin system at least 50% by weight consisting essentially of primary bonding resin; a weldability agent consisting essentially of a quantity of finely divided nickel equal to at least 15% by weight of all solids of the composition; the quantity of said resin system being about 10% to 525% by weight of said finely divided metal and nickel; a vehicle comprising an active organic solvent compatible with said resin system and dissolving said primary bonding resin into a liquid solution, and said vehicle being of sufficient total quantity for the composition to have a viscosity in the range of 20 to 280 seconds in a Ford No. 4 cup, said coating composition having essentially no zinc therein, said finely divided metal and nickel being suspended and disbursed in said liquid resin and said resin system being curable to a dry film tenaciously adhered to a steel substrate with said finely divided metal an nickel dispersed therein by heating a thin wet film of said coating composition to a temperature not greater than about 500° F. to provide such a dry film coating which is electric resistance weldable after curing and protects the metal substrate, form corrosion after being welded and is highly resistant to petrol chemicals and a neutral salt spray.

2. The coating composition of claim 1 which also comprises a quantity of a secondary resin equal to about 1% to 50% by weight of said primary bonding resin, said secondary resin comprising at least one of the resins of phenolic, triazine, amino, urea-formaldehyde, titanates, ketimines, hexo-methoxymethyl-melamine or benzoguanamine resins.

3. The coating composition of claim 1 which also comprises a quantity of a secondary resin equal to about 5% to 30% by weight of said primary bonding resin, said secondary resin consisting essentially of at least one of phenolic, triazine, amino, urea-formaldehyde, titanates, ketimines, hexo-methoxymethyl-melamine or benzoguanamine resins.

4. The coating composition of claim 1 wherein said primary bonding resin comprises at least one of the resins of the family of epoxy, phenoxy, polyvinylidene chloride, polyester, isocyanate or acrylic.

5. The coating composition of claim 1 wherein said primary bonding resin is selected from the group consisting of resins of epoxy, phenoxy, polyvinylidene chloride, polyester, isocyanate and acrylic.

6. The coating composition of claim 1 which also comprises a quantity of thixotropic agent equal to about 0.4% to 12% by weight of said finely divided metal and nickel.

7. The coating composition of claim 1 which also comprises a quantity of a suspension agent equal to about 0.2% to 5% by weight of said finely divided metal and nickel.

8. The coating composition of claim 1 which also comprises a quantity of a hygroscopic agent equal to about 0.2% to 12% by weight of said finely divided metal.

9. The coating composition of claim 1 which also comprises a drawable polymeric component consisting essentially of a quantity of polytetrafluorethylene equal to at least 1% by weight of the total solids of the composition.

10. The coating composition of claim 1 wherein said active solvent is acetone, cellosolve acetate, methyl ethyl ketone, methyl isobutyl ketone, dimethyl-formamide, xylene, toluene, dibasic ester, naphtha, propylene glycol acetate or blends thereof.

11. The coating composition of claim 1 which also comprises an inactive organic solvent selected from a group comprising aromatic hydrocarbons, alcohols or blends thereof in a quantity equal to about 10% to 40% by weight of the active organic solvents.

12. The coating composition of claim 1 wherein said organic solvents comprise a quantity equal to about 20% to 300% by weight of all of said resins.

13. The coating composition of claim 1 wherein said weldable nickel is in a form comprising at least one selected from the group of flakes or granules.

14. The coating composition of claim 1 wherein said weldable nickel is essentially in the form of granules.

* * * * *